United States Patent
Perner et al.

(10) Patent No.: US 12,186,599 B2
(45) Date of Patent: Jan. 7, 2025

(54) RATCHETING STRAP ADJUSTER

(71) Applicant: Pure Safety Group, Inc., Pasadena, TX (US)

(72) Inventors: Judd J. Perner, Missouri City, TX (US); Genith D. Ponce, Katy, TX (US); Luis D. Herrera, Houston, TX (US)

(73) Assignee: Pure Safety Group, Inc., Pasadena, TX (US)

( * ) Notice: Subject to any disclaimer, the term of this patent is extended or adjusted under 35 U.S.C. 154(b) by 0 days.

(21) Appl. No.: 18/233,612

(22) Filed: Aug. 14, 2023

(65) Prior Publication Data
US 2024/0139559 A1    May 2, 2024

Related U.S. Application Data

(60) Provisional application No. 63/421,623, filed on Nov. 2, 2022.

(51) Int. Cl.
*A62B 35/00* (2006.01)
*B23P 11/00* (2006.01)
(Continued)

(52) U.S. Cl.
CPC .......... *A62B 35/0025* (2013.01); *B23P 19/00* (2013.01); *B23P 19/04* (2013.01); *F16G 11/12* (2013.01); *B23P 11/00* (2013.01)

(58) Field of Classification Search
CPC ...... A62B 35/0025; B23P 19/00; B23P 19/04; B23P 11/00; F16G 11/12; Y10T 29/49826
(Continued)

(56) References Cited

U.S. PATENT DOCUMENTS 4,860,606 A    8/1989    Rousseau
5,186,586 A *  2/1993    Stephenson, Jr. ....... B60P 7/083
                                                      410/103

(Continued)

FOREIGN PATENT DOCUMENTS

EP    2414048 B1    10/2017
WO    2010117651 A1  10/2010

OTHER PUBLICATIONS

International Search Report for PCT/US2018/061451; Micheal Becker; Feb. 12, 2019; 6 pages.

(Continued)

*Primary Examiner* — Sarang Afzali
*Assistant Examiner* — Darrell C Ford
(74) *Attorney, Agent, or Firm* — Dicke, Billig & Czaja, PLLC

(57) ABSTRACT

A method of assembling a ratcheting strap adjuster comprises inserting a distal end of a rotation assembly through first and second apertures in respective first and second side plates of a frame, with a proximal end of the rotation assembly positioned proximate the first side plate and the distal end positioned proximate the second side plate. A captive member is movably connected to the second side plate proximate the distal end, wherein the captive member is movable between an engaging position and a releasing position, and wherein an engaging portion of the captive member is configured and arranged to selectively engage the distal end of the rotation assembly in the engaging position.

23 Claims, 16 Drawing Sheets

(51) Int. Cl.
*B23P 19/00* (2006.01)
*B23P 19/04* (2006.01)
*F16G 11/12* (2006.01)

(58) Field of Classification Search
USPC .............................. 29/428, 525.01, 525.06
See application file for complete search history.

(56) References Cited

U.S. PATENT DOCUMENTS

| | | | |
|---|---|---|---|
| 5,853,164 A * | 12/1998 | Hunt | B21F 9/00 |
| | | | 242/598.5 |
| 6,230,370 B1 | 5/2001 | Nelsen | |
| 6,241,174 B1 | 6/2001 | Nelsen et al. | |
| 6,350,088 B1 * | 2/2002 | Priester | B60P 7/083 |
| | | | 410/104 |
| 6,799,751 B1 | 10/2004 | Anderson | |
| 7,350,767 B2 | 4/2008 | Huang | |
| 8,794,378 B2 | 8/2014 | Wolner | |
| 8,967,332 B2 | 3/2015 | Wolner | |
| 9,162,605 B2 * | 10/2015 | Durand | B60P 7/083 |
| 9,402,431 B1 * | 8/2016 | Orsburne | A41F 9/025 |
| 10,718,406 B2 | 7/2020 | Farrell | |
| 2002/0153517 A1 | 10/2002 | Huang | |
| 2006/0088395 A1 * | 4/2006 | Booher | B61D 45/00 |
| | | | 410/103 |
| 2008/0128541 A1 | 6/2008 | Huang | |
| 2010/0242232 A1 | 9/2010 | Wolner | |
| 2010/0242233 A1 | 9/2010 | Wolner | |
| 2010/0322737 A1 * | 12/2010 | Huang | B60P 7/083 |
| | | | 410/100 |
| 2017/0231799 A1 | 8/2017 | Nolt | |
| 2018/0023666 A1 | 1/2018 | Polak et al. | |
| 2019/0154116 A1 | 5/2019 | Farrell | |
| 2020/0039418 A1 | 2/2020 | Willodson | |
| 2020/0347912 A1 | 11/2020 | Farrell | |
| 2022/0096881 A1 | 3/2022 | Patton | |

OTHER PUBLICATIONS

International Search Report and Written Opinion from PCT/US2023/033108; Taina Matos; 9 pages; Jan. 31, 2024.

* cited by examiner

RATCHETING STRAP ADJUSTER

BACKGROUND

To reduce the risk and severity of injury, it is important that a safety harness worn by a user for fall protection fits properly. A loose fitting harness may cause a user to at least partially slip out of the harness or cause loads to distribute unevenly on the user during a fall, which could cause an unsafe condition. A tight fitting harness may also cause loads to distribute unevenly during a fall and may cause discomfort during use. Therefore, the adjustment of straps of a harness is important to facilitate proper fit. However, some adjustment mechanisms can be difficult to use or not easily understood, which may discourage users from properly adjusting their harnesses. Additionally, loose strap ends can create an additional hazard in the form of snagging or entanglement, which could cause the user to fall.

For the reasons stated above and for other reasons stated below, which will become apparent to those skilled in the art upon reading and understanding the present specification, there is a need in the art for an improved strap adjuster.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a method of assembling a ratcheting strap adjuster comprises obtaining a frame, a rotation assembly, and a captive member. The frame includes a first side plate operatively connected to a second side plate, the first side plate having a first aperture and the second side plate having a second aperture aligned with the first aperture. The rotation assembly includes an intermediate portion interconnecting a proximal end and a distal end. The captive member has an engaging portion and a lever portion. The distal end of the rotation assembly is inserted through the first and second apertures, and the proximal end is positioned proximate the first side plate and the distal end is positioned proximate the second side plate. The captive member is movably connected to the second side plate proximate the distal end, wherein the captive member is movable between an engaging position and a releasing position, and wherein the engaging portion is configured and arranged to selectively engage the distal end of the rotation assembly in the engaging position.

In one embodiment, a method of assembling a ratcheting strap adjuster comprises obtaining a frame, a rotation assembly, and a captive member. The frame includes a first side plate operatively connected to a second side plate, the first side plate having a first aperture and the second side plate having a second aperture aligned with the first aperture. The rotation assembly includes an intermediate portion interconnecting a proximal end including a knob and a distal end including a ratchet portion. The captive member has an engaging portion and a lever portion. The distal end of the rotation assembly is inserted through the first and second apertures, and the knob is positioned proximate the first side plate and the ratchet portion is positioned proximate the second side plate. The captive member is pivotally connected to the second side plate proximate the ratchet portion, wherein the captive member is pivotable between an engaging position and a releasing position, and wherein the engaging portion is configured and arranged to selectively engage the ratchet portion of the rotation assembly in the engaging position.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

Figure 1:
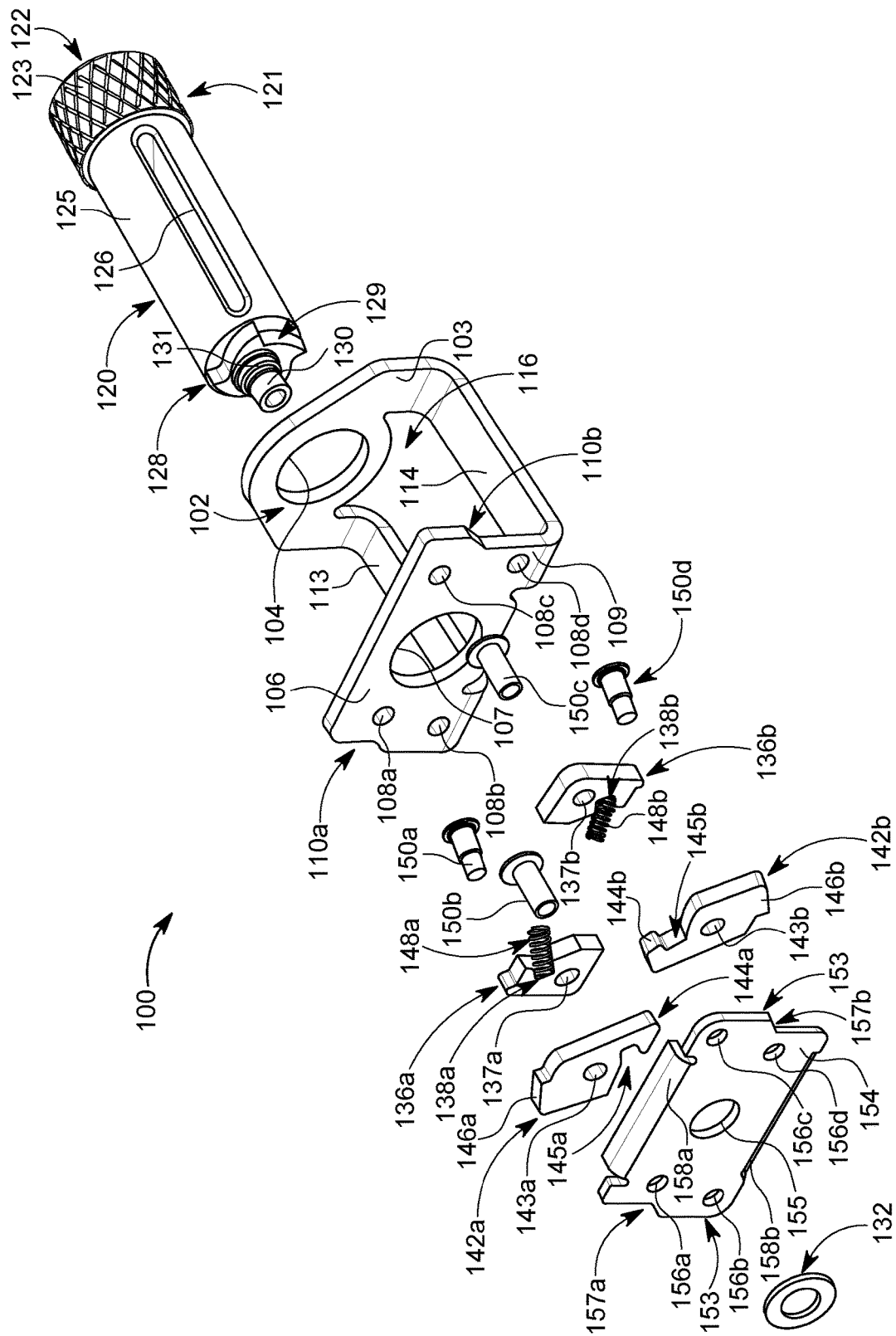
FIG. 1 is an exploded front perspective view of an embodiment ratcheting strap adjuster constructed in accordance with the principles of the present invention.

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide a compact ratcheting strap adjuster intended to be used as part of a safety harness assembly to adjust how the harness strap(s) fit about a user by easily and quickly adjusting the length(s) of the strap(s). For example, a strap adjuster could be operatively connected to each of the shoulder straps proximate the user's torso. A strap adjuster could also be operatively connected to a chest strap, leg strap(s), a waist strap, and any other suitable strap.

In one embodiment, a strap adjuster 100 comprises a rotation assembly 120 including a knob 122, a shaft portion 125, and a ratchet portion 129 that are preferably one integral part. Although it is preferred that the rotation assembly 120 is an integral part, it is recognized that separate components can be operatively connected to form the rotation assembly 120.

The rotation assembly 120 is operatively connected to a frame 102, which in one embodiment is made of sheet metal, cut into a desired shape and then bent to form opposing side plates 103 and 106 interconnected by connecting plate(s) 113 and 114, by sliding the rotation assembly 120 through aligned apertures 104 and 107 in the respective side plates 103 and 106 of the frame 102. Optionally, the frame 102 is heat treated after being bent. Proximate the rotation assembly's proximal end 121, the knob 122 diameter is larger than the aperture 104 thereby preventing the rotation assembly 120 from being slid all the way through the frame 102 during assembly. The ratchet portion 129, positioned proximate the rotation assembly's distal end 128 and proximate an outer surface 109 of the side plate 106, are configured and arranged to selectively engage at least one captive member, in this example captive members 142a and 142b, such as a pawl or other suitable movable member. In one embodiment, the ratchet portion 129 includes gear teeth, in this example preferably four gear teeth. In this example, there are preferably two independent, pivotable, spring-loaded pawls configured and arranged to allow controlled, incremental rotation in one direction, a winding direction. The pawl(s) also prevent unwanted rotation in the reverse direction, an unwinding direction, unless the pawl(s) is/are disengaged with the ratchet portion 129 thereby allowing rotation of the rotation assembly 120 in the reverse direction. In this example, the side plate 106 includes apertures 108a and 108d through which rivets 150a and 150d extend to pivotally connect the pawl(s) thereto. Optionally, the side plate 106 can also include apertures 108b and 108c through which rivets 150b and 150c extend to operatively connect spacer(s) 136a and 136b thereto.

The ratchet assembly, including the ratchet portion 129 and the captive member(s) 142a and 142b, is preferably housed proximate one side of the frame 102, such as proximate the outer surface 109 of one of the side plates, such as side plate 106. In this example, a cover 153, which is preferably made of sheet metal, is operatively connected to the side plate 106 to form a cavity 116 therebetween in which the ratchet portion 129 and captive member(s) 142a and 142b are positioned. Optionally, spacers 136a and 136b could be integral with the cover 153 rather than separate components. Other suitable materials, such as plastic, metal, and composite materials could be used for the cover 153. A distal end 128 of the rotation assembly 120 extends through an aperture 155 in the cover 153. Preferably, the distal end 128 includes a machined step or ledge 131 and a shank 130 that can be compressed or distorted to serve a similar function as a rivet. Preferably, an optional washer 132 is positioned between the step 131 and the "rivet" portion of the shank 130 thereby preventing the rotation assembly 120 from being pulled out of the frame 102. The frame 102 is captured between the knob 122 proximate the proximal end 121 and the "rivet" portion of the shank 130 proximate the distal end 128 of the rotation assembly 120. In addition, the shaft portion 125 includes a slot 126 in an intermediate portion, between the proximal and distal ends, configured and arranged to receive a portion of a harness strap, which is preferably made of webbing. The strap 172 can be connected to the shaft portion 125 by inserting the strap through the slot 126, folding the distal end of the strap back onto a portion of the strap on the opposite side of the shaft portion 125, and securing the distal end thereto with stitching or the like. Optionally, the folded, secured distal end of strap 172 can be positioned within the slot 126, which can be configured and arranged to receive the distal end while preventing it from passing through the slot. When the knob 122 is rotated, thereby rotating the other rotation assembly components, the strap is wound/unwound from the shaft portion 125 to adjust its length as desired. A second strap 173 can be routed about one of the connecting plates 113 or 114 and its distal end can be secured to the second strap 173 with stitching or the like.

In one embodiment, two pawls are positioned proximate opposing sides of the ratchet portion, and the positions of the ratchet portion's gear teeth relative to the pawls allow finer increments of adjustment. In addition, because both pawls must be disengaged from the gear teeth to allow rotation in the unwinding direction, safety is enhanced by requiring increased actions to release the strap.

In one embodiment, an integrated knob, shaft portion, and ratchet portion allows greater manufacturing efficiency by lowering part count and assembly steps. In addition, an integral component is stronger to withstand loads and is therefore preferred but not required. It is recognized that these components could be separate components operatively connected.

Figure 2:
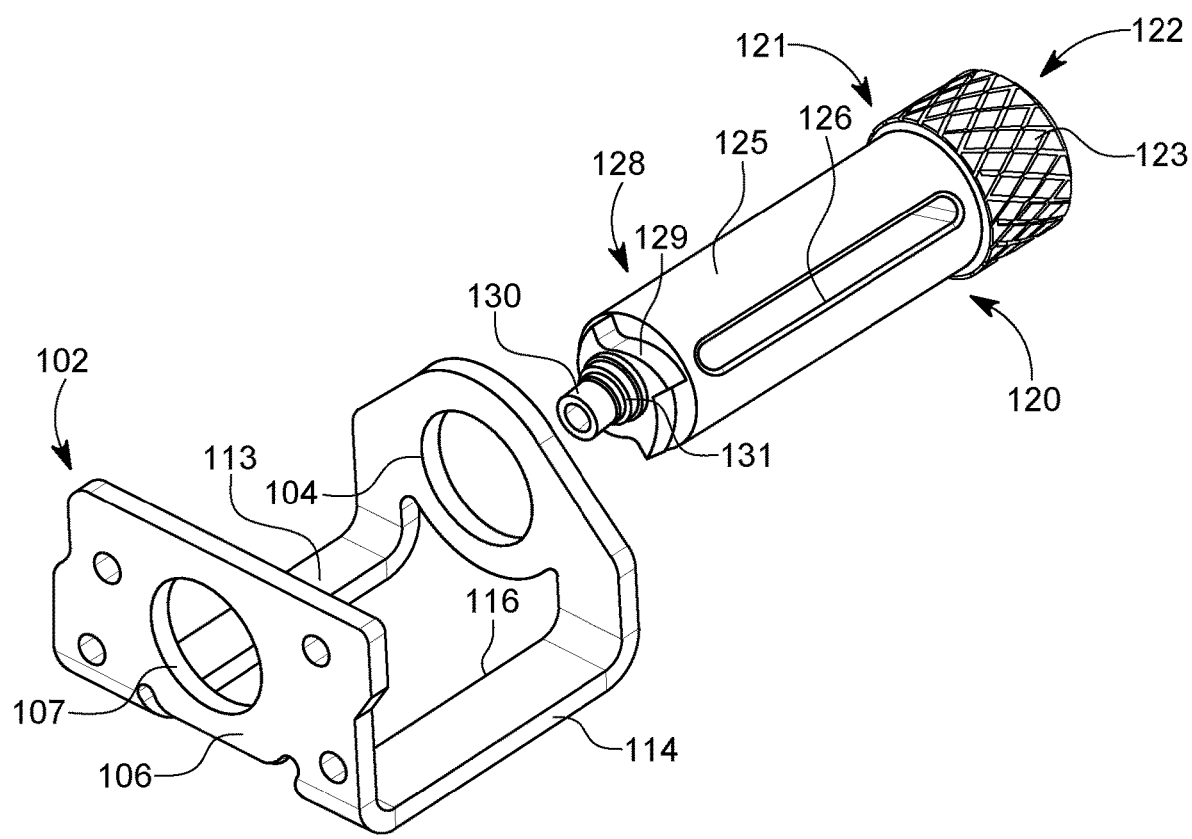
FIG. 2 is an exploded front perspective view of a frame and a rotation assembly of the ratcheting strap adjuster shown in FIG. 1.
Figure 3:
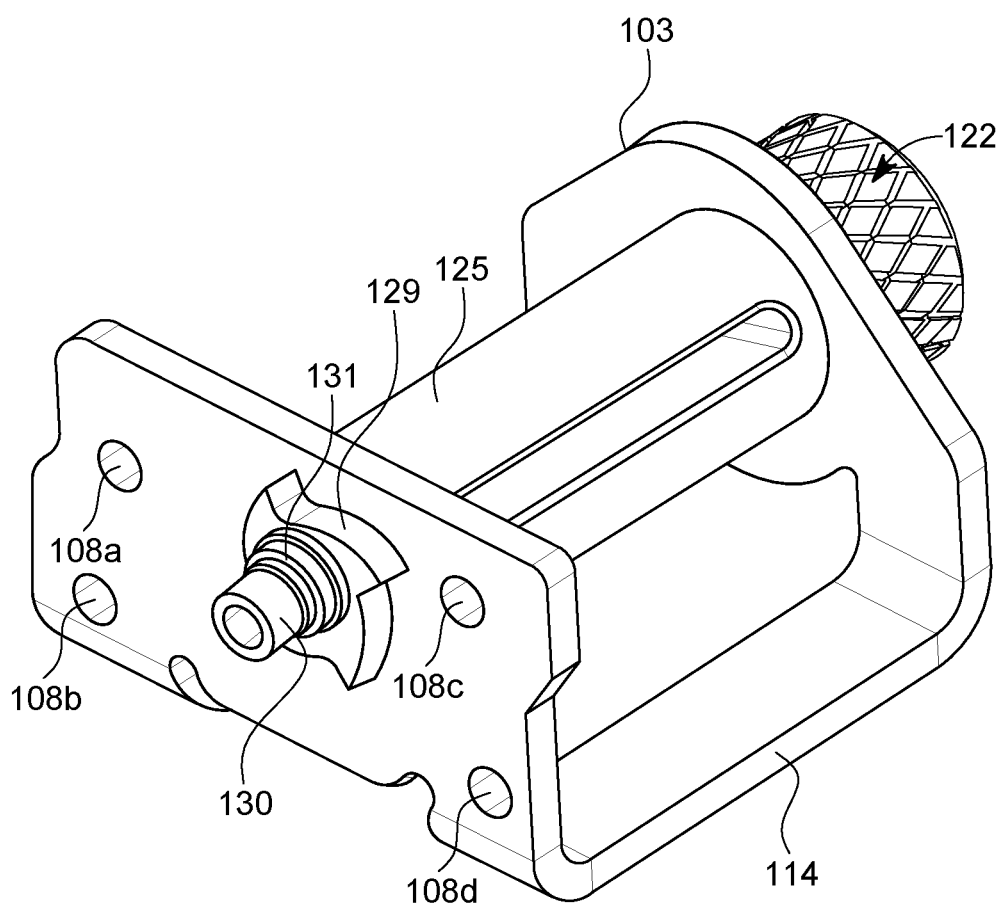
FIG. 3 is a front perspective view of the assembled frame and rotation assembly of the ratcheting strap adjuster shown in FIG. 1.
Figure 4:
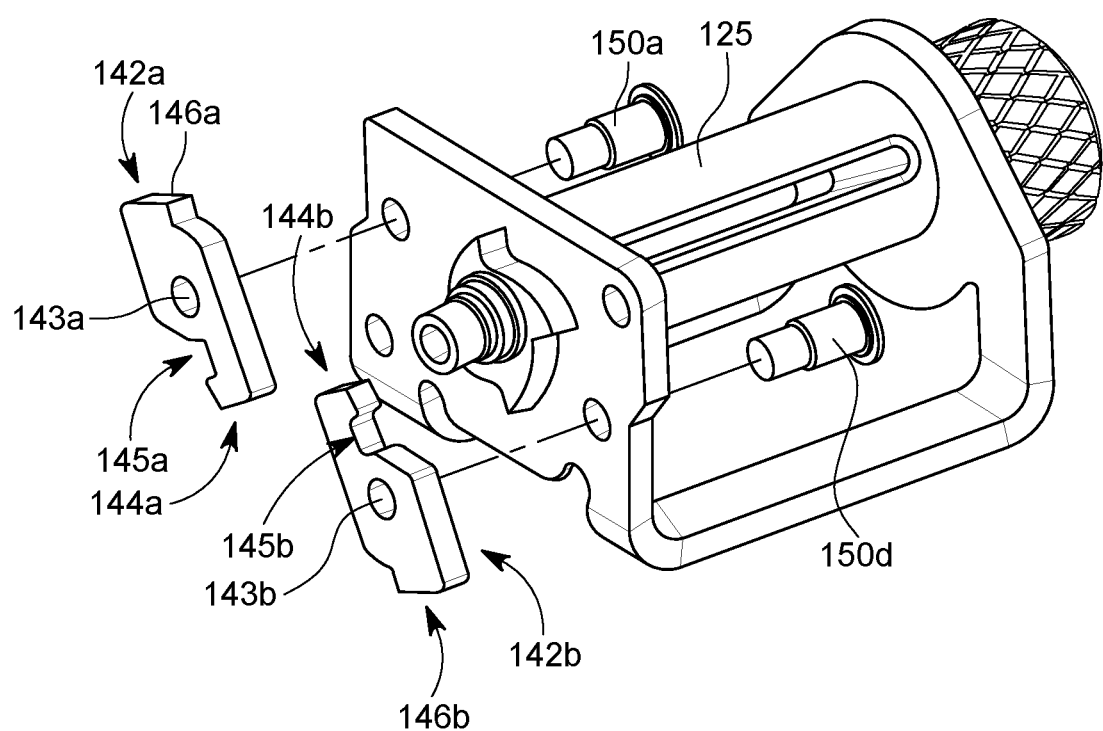
FIG. 4 is a partially exploded front perspective view of captive members relative to the assembled frame and rotation assembly of the ratcheting strap adjuster shown in FIG. 1.
Figure 5:
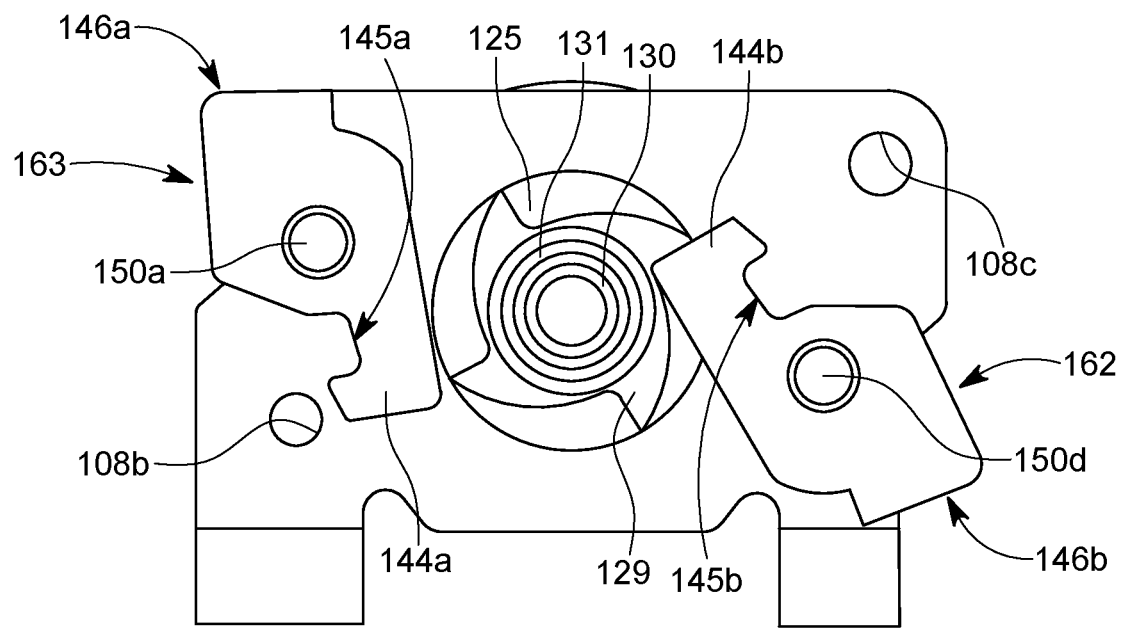
FIG. 5 is a front perspective view of the assembled captive members, frame, and rotation assembly of the ratcheting strap adjuster shown in FIG. 1.
Figure 6:
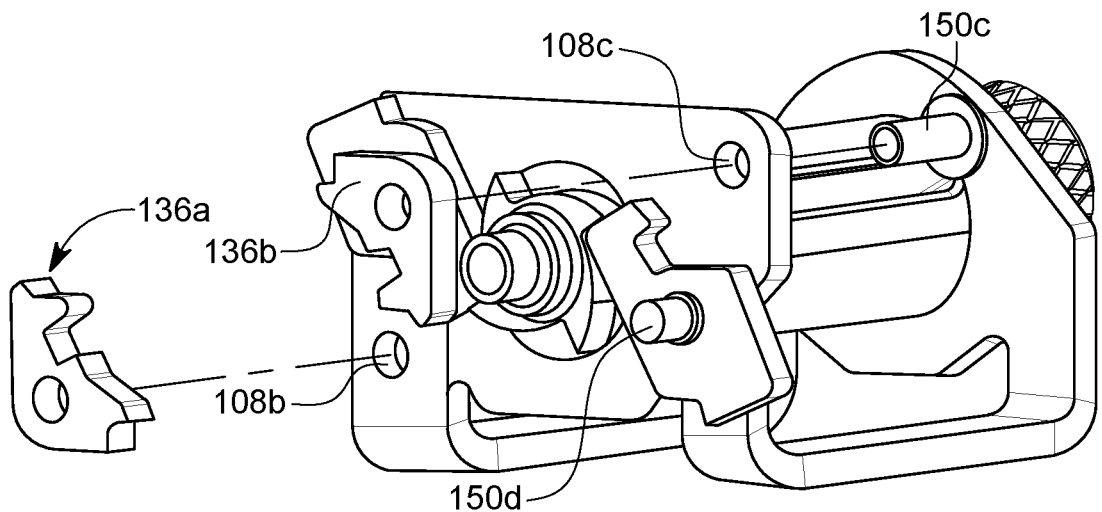
FIG. 6 is a partially exploded front perspective view of spacers relative to the assembled captive members, frame, and rotation assembly of the ratcheting strap adjuster shown in FIG. 1.
Figure 7:
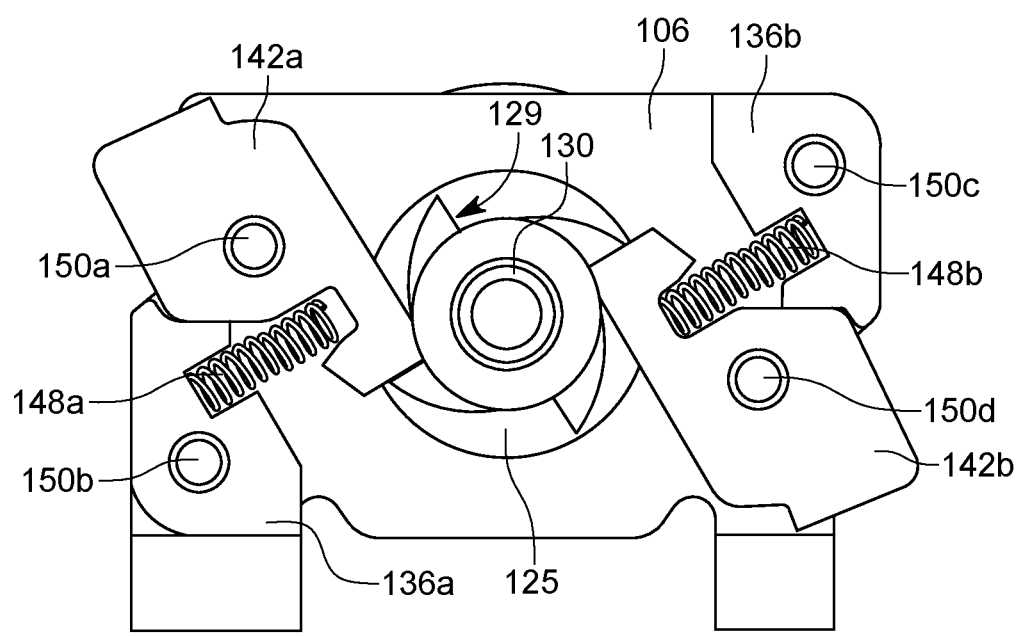
FIG. 7 is a front view of the assembled spacers, captive members, frame, and rotation assembly of the ratcheting strap adjuster shown in FIG. 1.
Figure 8:
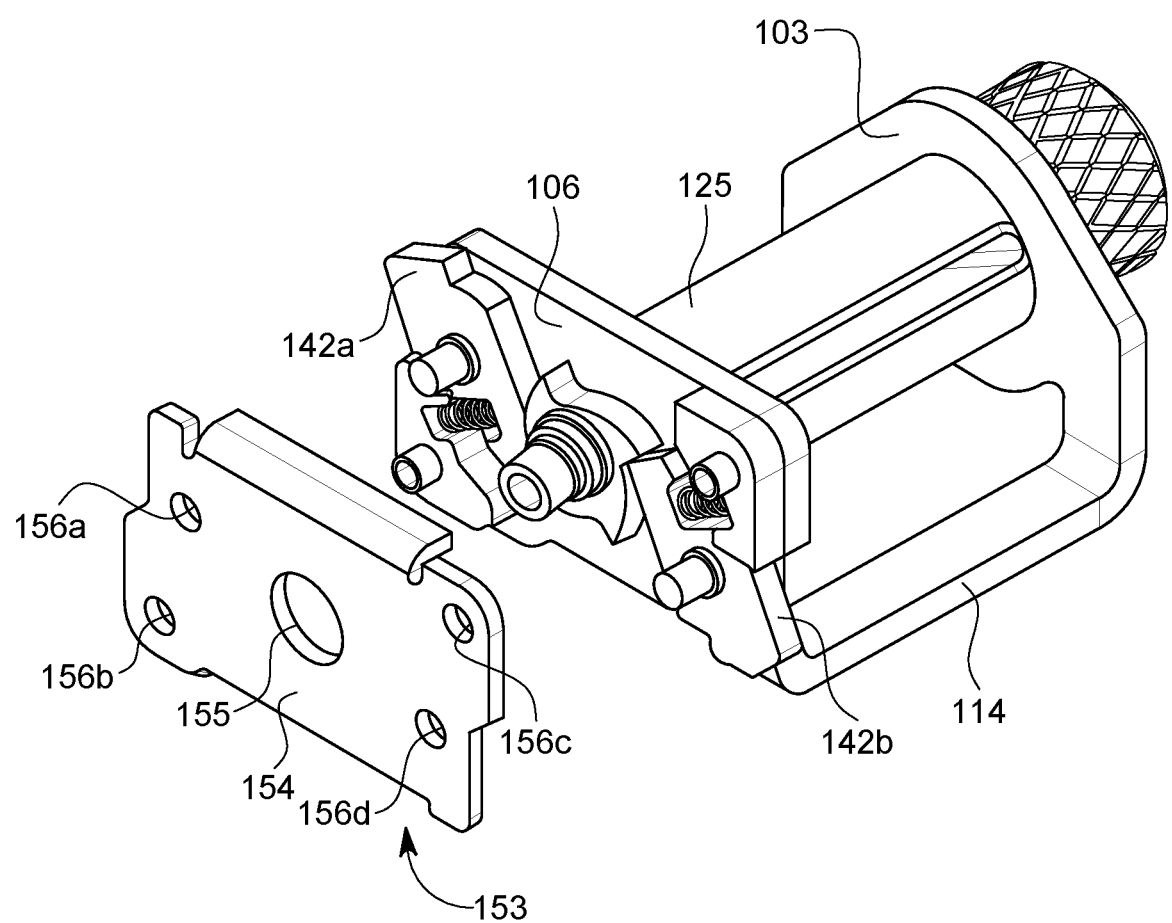
FIG. 8 is a partially exploded front perspective view of a cover relative to the assembled spacers, captive members, frame, and rotation assembly of the ratcheting strap adjuster shown in FIG. 1.
Figure 9:
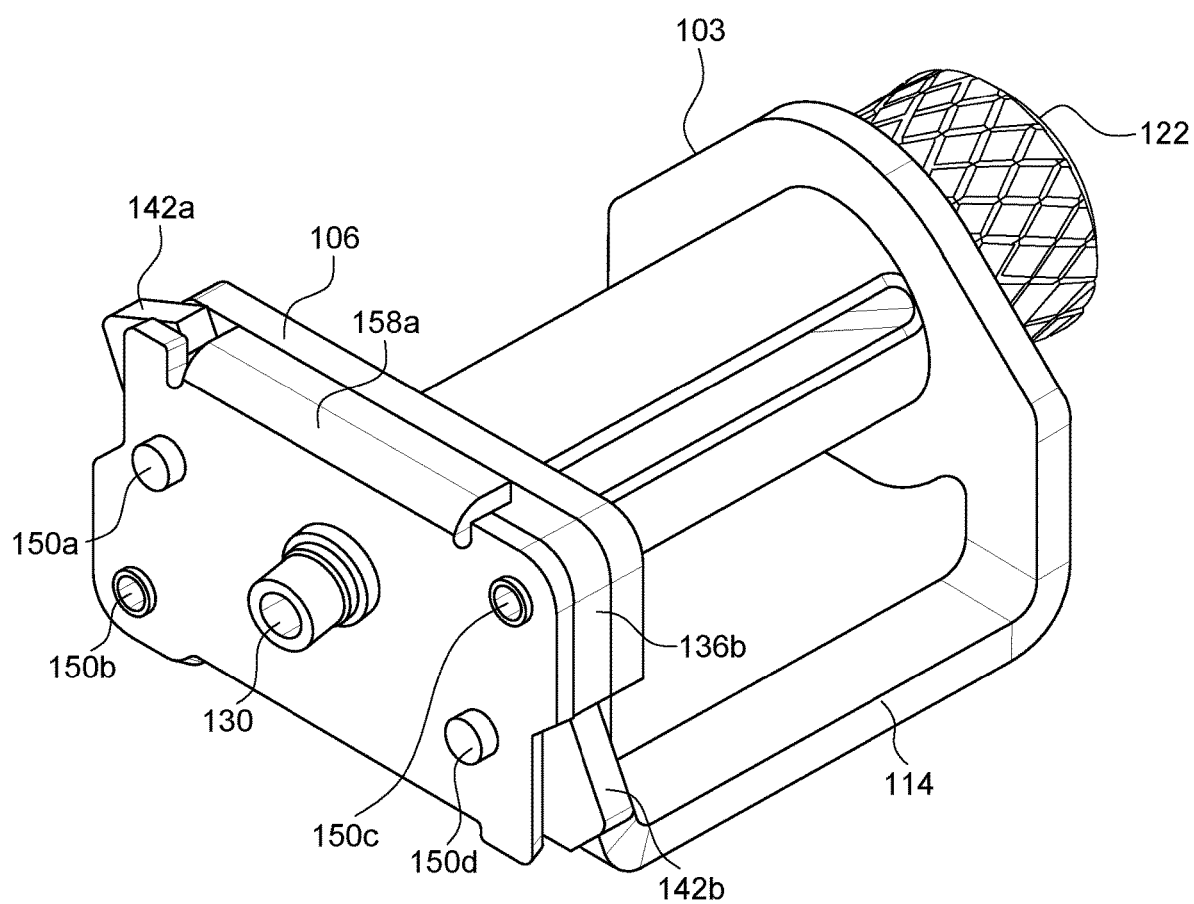
FIG. 9 is a front perspective view of the assembled cover, spacers, captive members, frame, and rotation assembly of the ratcheting strap adjuster shown in FIG. 1.
Figure 10:
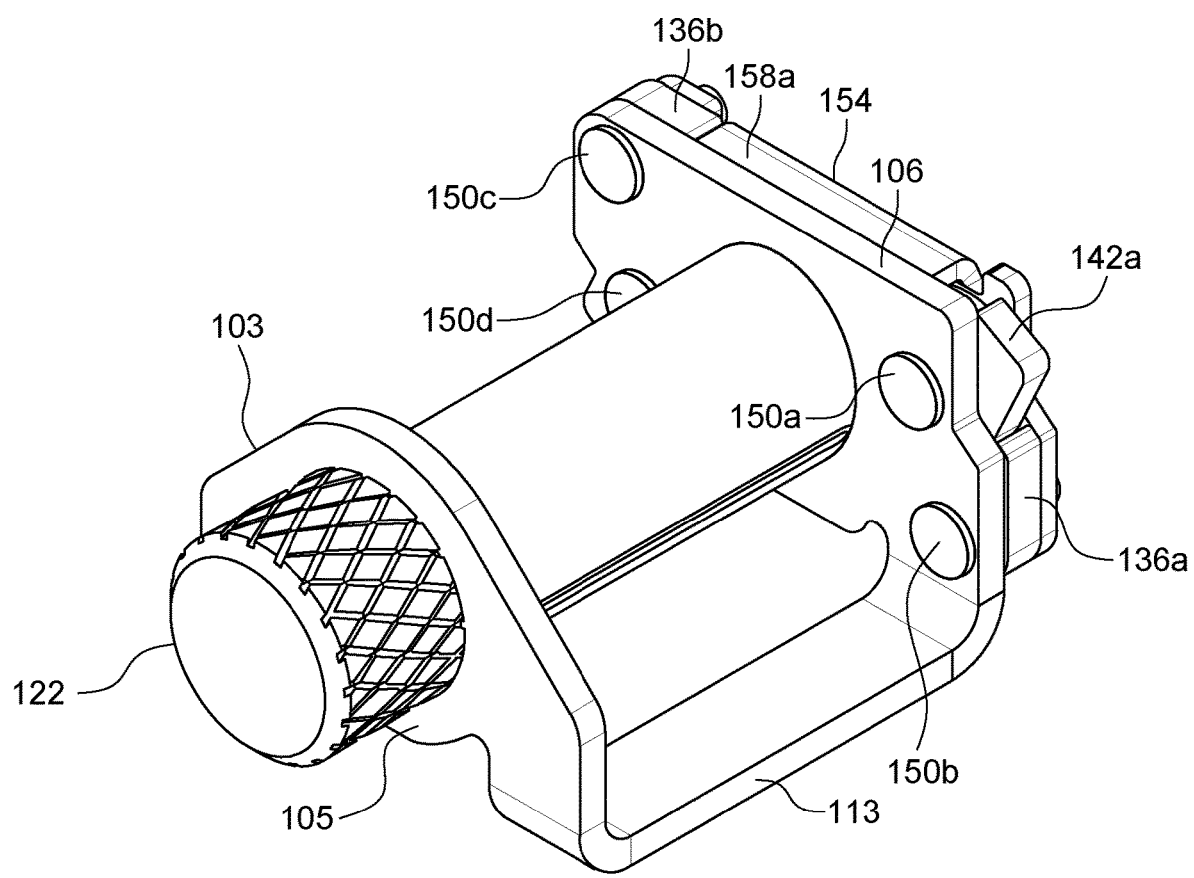
FIG. 10 is a rear perspective view of the assembled cover, spacers, captive members, frame, and rotation assembly of the ratcheting strap adjuster shown in FIG. 1.
Figure 11:
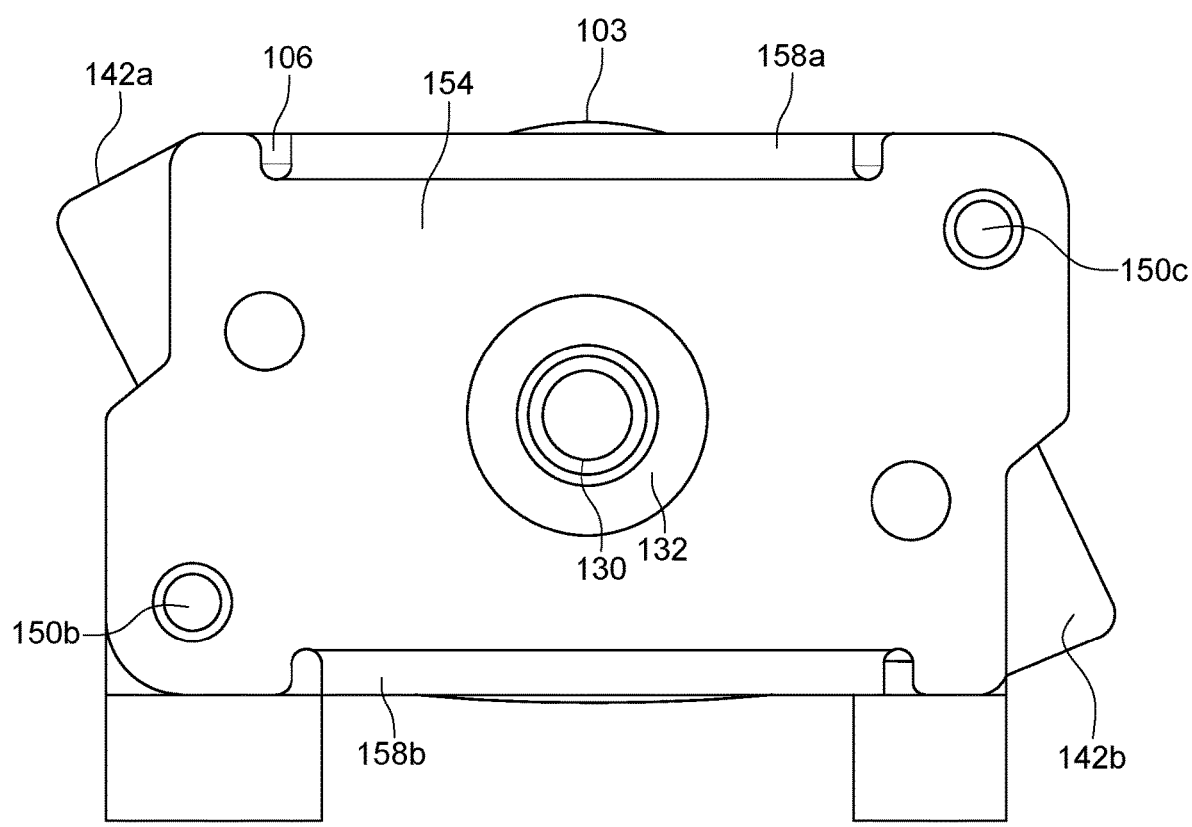
FIG. 11 is a front view of the assembled cover, spacers, captive members, frame, and rotation assembly of the ratcheting strap adjuster shown in FIG. 1.
Figure 12:
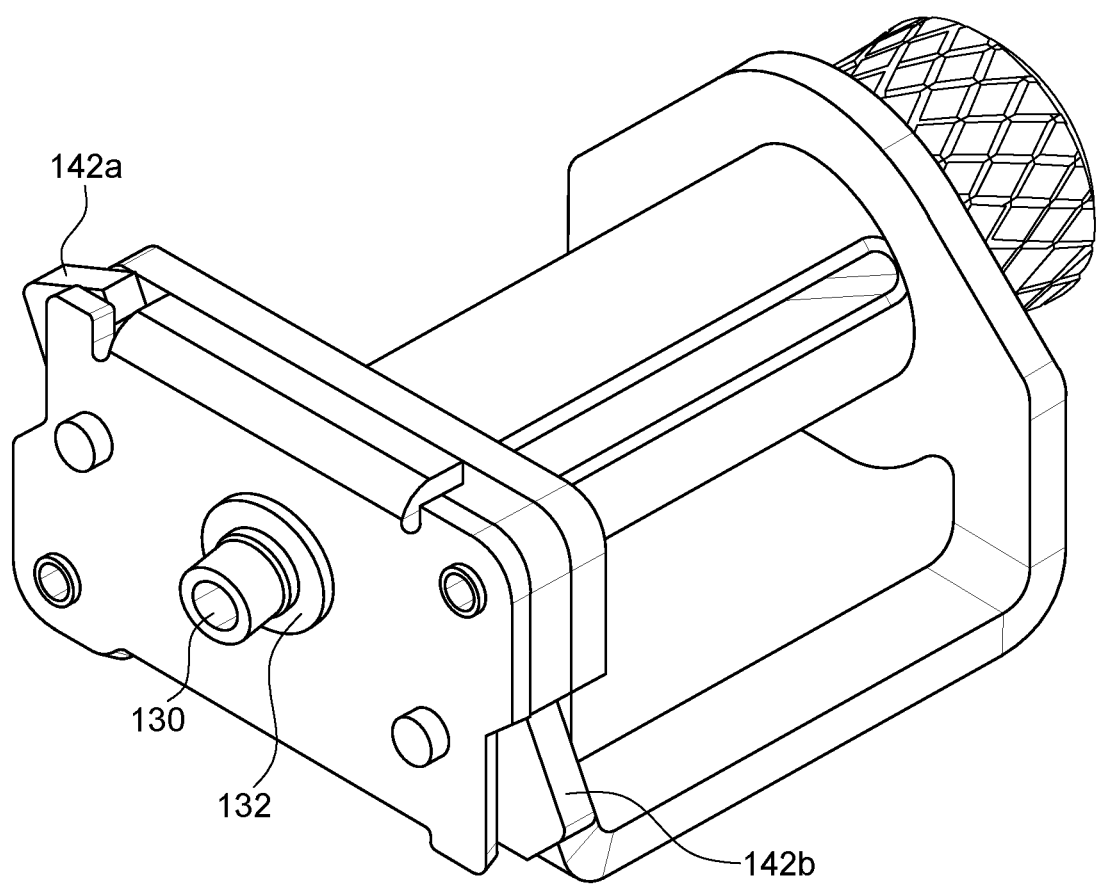
FIG. 12 is a front perspective view of an optional washer operatively connected to a protrusion of the rotation assembly relative to the assembled cover, spacers, captive members, frame, and rotation assembly of the ratcheting strap adjuster shown in FIG. 1.
Figure 13:
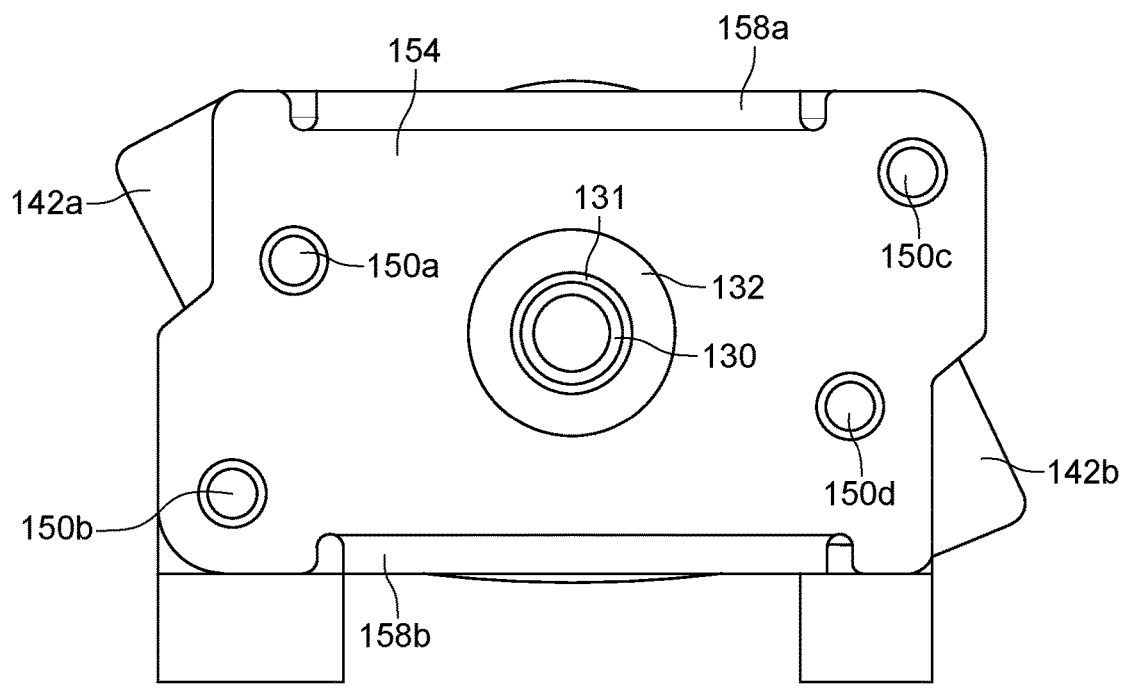
FIG. 13 is a front view of the assembled washer, cover, spacers, captive members, frame, and rotation assembly of the ratcheting strap adjuster shown in FIG. 1.
Figure 14:
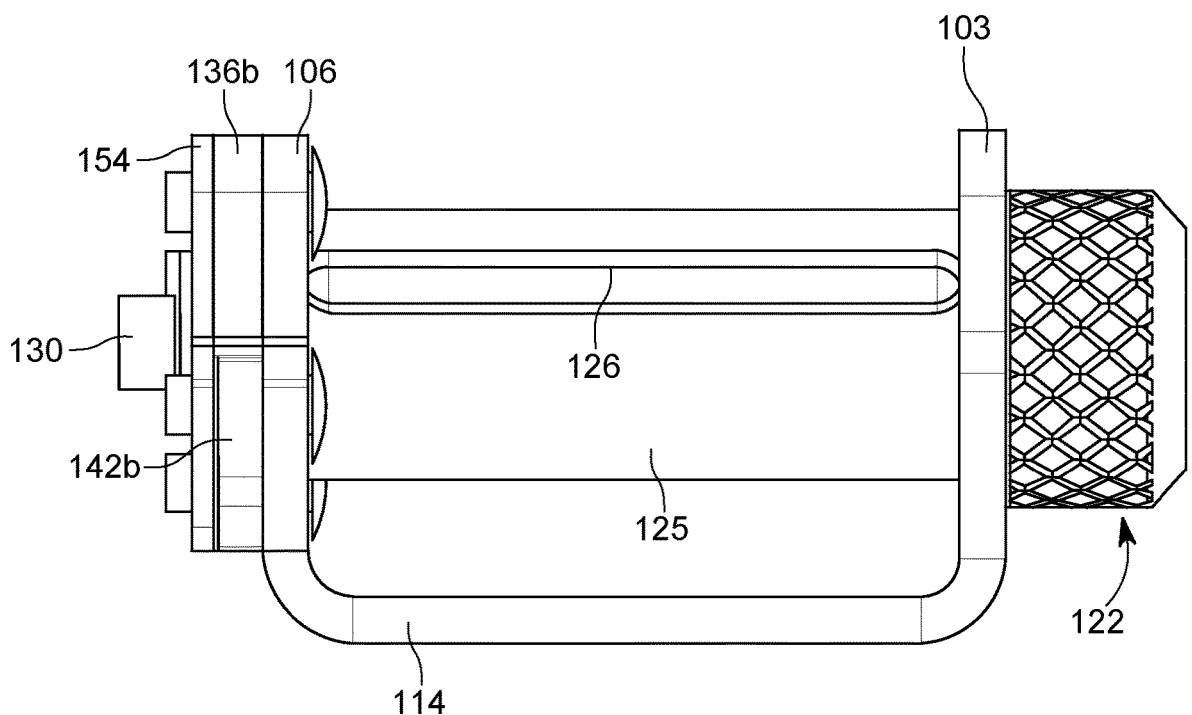
FIG. 14 is a side view of the assembled washer, cover, spacers, captive members, frame, and rotation assembly of the ratcheting strap adjuster shown in FIG. 1.
Figure 15:
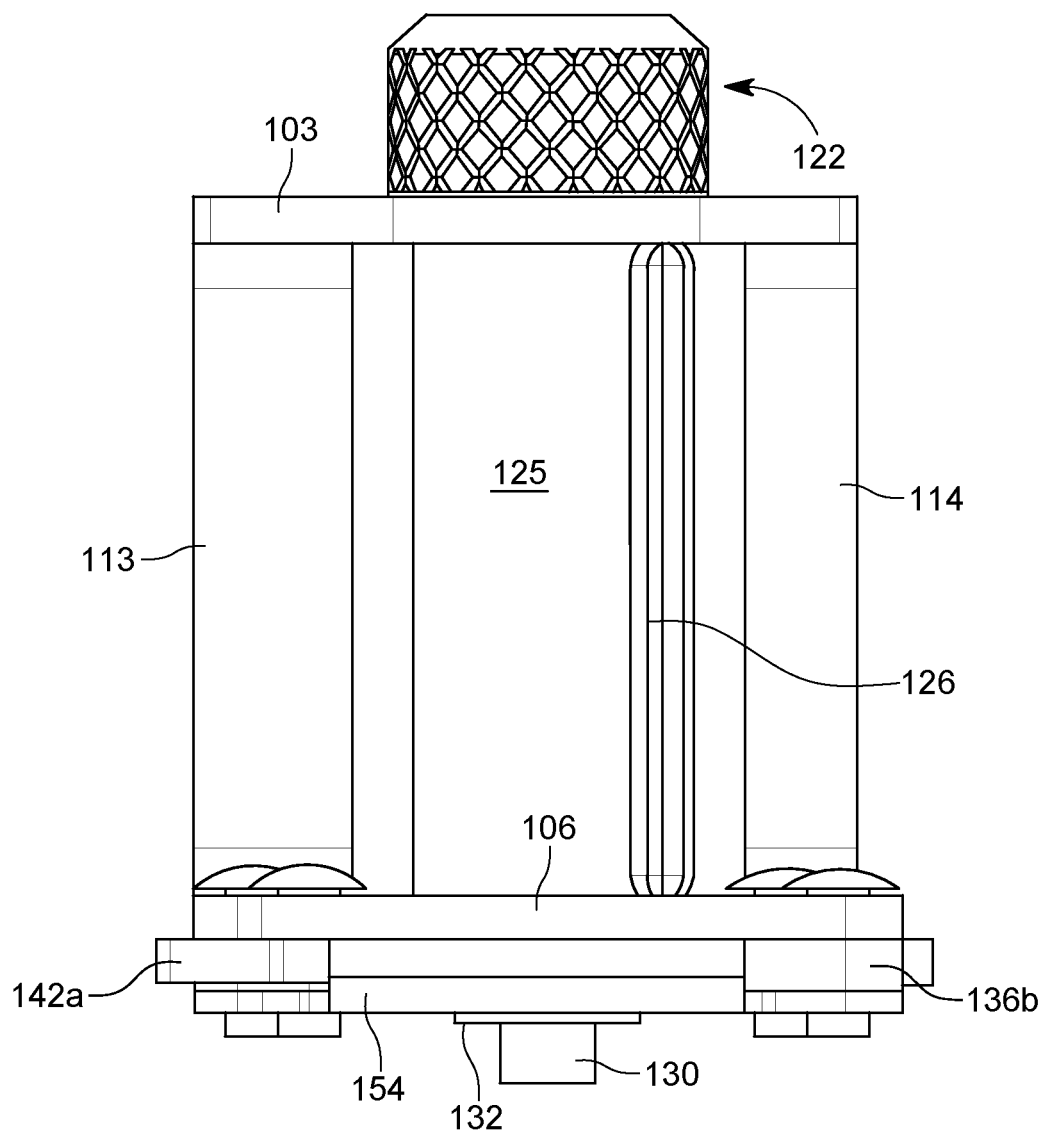
FIG. 15 is a top view of the assembled washer, cover, spacers, captive members, frame, and rotation assembly of the ratcheting strap adjuster shown in FIG. 1.
Figure 16:
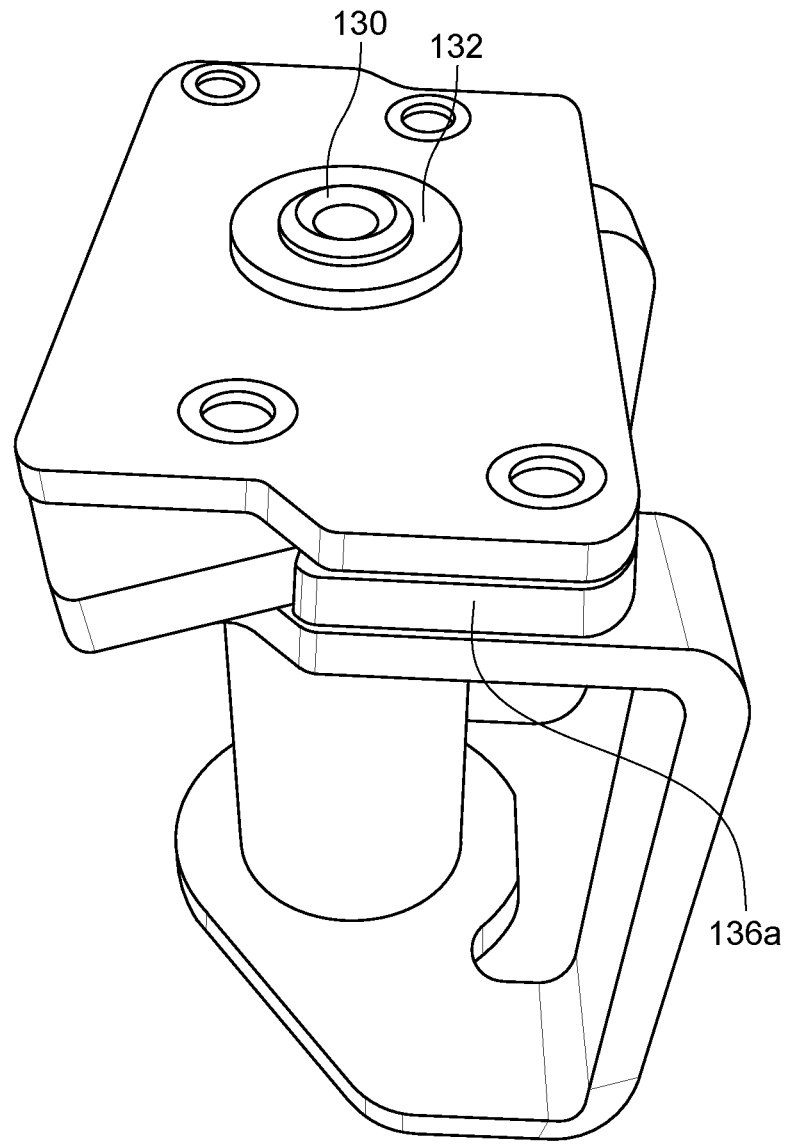
FIG. 16 is a front perspective view of the assembled washer, cover, spacers, captive members, frame, and rotation assembly of the ratcheting strap adjuster shown in FIG. 1 with the protrusion engaging the washer.
Figure 17:
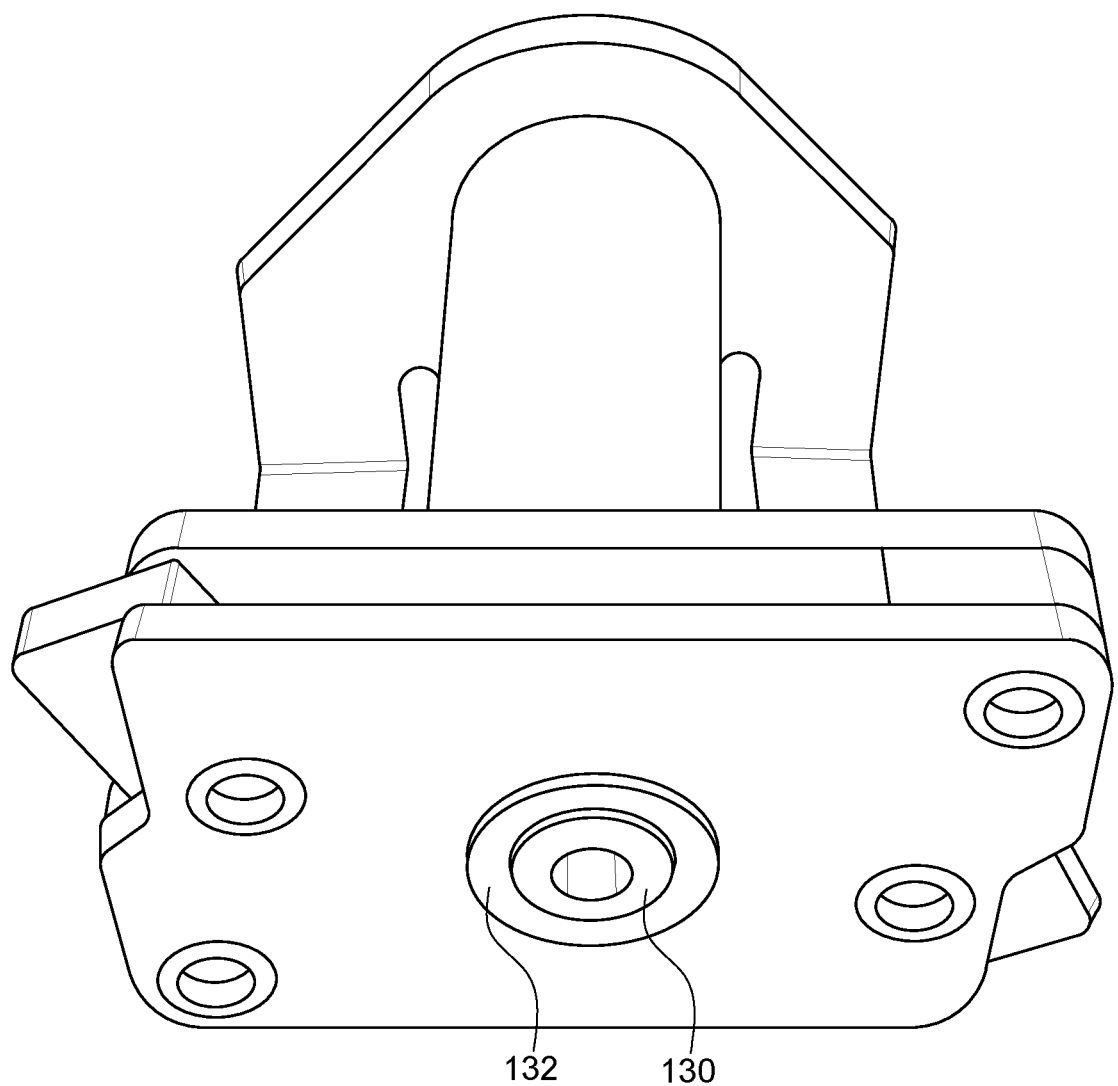
FIG. 17 is a top perspective view of the assembled washer, cover, spacers, captive members, frame, and rotation assembly of the ratcheting strap adjuster shown in FIG. 1 with the protrusion engaging the washer.
Figure 18:
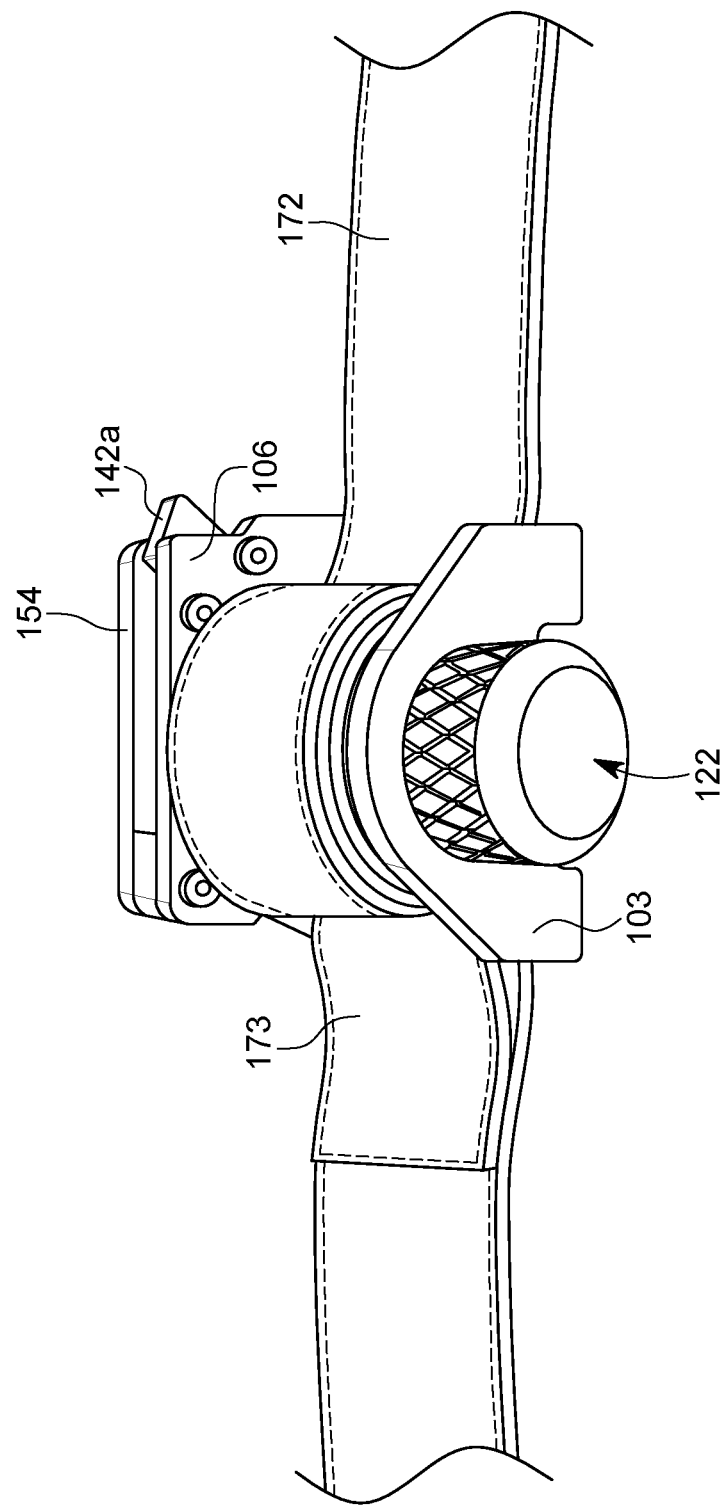
FIG. 18 is a perspective view of the assembled ratcheting strap adjuster shown in FIG. 1 with first and second straps operatively connected thereto.

To assemble the ratcheting strap adjuster 100, the distal end 128 of the rotation assembly 120 is inserted through the first plate aperture 104 of the first side plate 103 and through the second plate aperture 107 of the second side plate 106 of the frame 102. The knob 122, preferably having a knurled surface 123, proximate the proximal end 121 is positioned proximate the outer surface 105 of the first side plate 103 and the ratchet portion 129 proximate the distal end 128 is positioned proximate the outer surface 109 of the second side plate 106. The rotation assembly 120 assembled with the frame 102 is illustrated in FIGS. 2 and 3.

The captive members 142a and 142b (e.g., pawls) and the spacers 136a and 136b can be assembled in any order. The second side plate 106 includes apertures 108a, 108b, 108c, and 108d through which rivets 150a, 150b, 150c, and 150d are inserted. The rivet 150a extends through the aperture 143a in the captive member 142a, the rivet 150b extends through the aperture 137a in the spacer 136a, the rivet 150c extends through the aperture 137b in the spacer 136b, and the rivet 150d extends through the aperture 143b in the captive member 142b. A biasing member 148a is positioned between the first spacer notch 138a and the first captive member notch 145a, and a biasing member 148b is positioned between the second spacer notch 138b and the second captive member notch 145b.

The cover 153 is then positioned so that the rivets 150a, 150b, 150c, and 150d extend through apertures 156a, 156b, 156c, and 156d and the protrusion 130 extends through the aperture 155 of the plate portion 154. Preferably, the side plate 106 includes notches 110a and 110b and the plate portion 154 includes notches 157a and 157b configured and arranged to provide access to the lever portions 146a and 146b. Optional top extension 158a and bottom extension 158b extend over top and bottom gaps between the plate portion 154 and the second side plate 106.

The rivets 150a, 150b, 150c, and 150d are then compressed as known in the art to secure the cover 153 to the second side plate 106 together thereby sandwiching the captive members and the spacers therebetween. An optional washer 132, which acts as a spacer, is positioned on the protrusion 130, about the ledge 131, and then the protrusion 130 is compressed like a rivet as known in the art to secure the distal end 128 to the frame 102. Therefore, the frame 102 is secured between the knob 122 and the compressed protrusion 130 and the rotation assembly 120 is rotatably connected to the frame 102.

In use, the biasing members 148a and 148b each independently provide a biasing force that biases the respective captive member 142a and 142b toward the engaging position 162, with the engaging portion 144a and 144b engaging the ratchet portion 129. The gear teeth of the ratchet portion 129 are preferably configured and arranged to allow rotation in a winding direction but prevent rotation in an unwinding direction in the engaging position 162. When each of the lever portions 146a and 146b is moved inward relative to the frame 102, the biasing force is overcome and the respective engaging portion 144a and 144b pivots away from the ratchet portion 129 in the releasing position 163. In this embodiment, when two captive members are used, to rotate the rotation assembly 120 in the unwinding position, both captive members 142a and 142b must be positioned in the releasing position 163.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method of assembling a ratcheting strap adjuster, the method comprising:
    obtaining a frame including a first side plate operatively connected to a second side plate, the first side plate having a first aperture and the second side plate having a second aperture aligned with the first aperture;
    obtaining a rotation assembly including an intermediate portion interconnecting a proximal end and a distal end, a ratchet portion being operatively connected to the distal end and including gear teeth;
    obtaining a captive member having an engaging portion and a lever portion;
    inserting the distal end including the ratchet portion of the rotation assembly through the first and second apertures and positioning the proximal end proximate the first side plate and the distal end proximate the second side plate; and
    movably connecting the captive member relative to the frame proximate the ratchet portion, wherein the captive member is movable between an engaging position and a releasing position, wherein the engaging portion is configured and arranged to selectively engage the ratchet portion of the rotation assembly in the engaging position.

2. The method of claim 1, further comprising operatively connecting the ratcheting strap adjuster to a safety harness, wherein the intermediate portion of the rotation assembly includes a slot, wherein at least one strap of the safety harness is routed through the slot.

3. The method of claim 1, wherein the proximal end includes a knob and the intermediate portion includes a shaft portion.

4. The method of claim 3, wherein the knob, the shaft portion, and the ratchet portion are integral.

5. The method of claim 1, wherein the captive member is movably connected relative to the frame by pivoting about a fastener operatively connected to the frame.

6. The method of claim 1, wherein the captive member includes a biasing member receiver configured and arranged to receive a portion of a biasing member, further comprising positioning the portion of the biasing member in the biasing member receiver to place a biasing force on the captive member toward the engaging position, wherein placing a force on the lever portion overcomes the biasing force of the biasing member and moves the captive member toward the release position.

7. The method of claim 1, further comprising operatively connecting a cover to the second side plate after the distal end of the rotation assembly is inserted through the first and second apertures, the cover being a part of the frame, wherein the ratchet portion and the captive member are positioned in a cavity between the cover and the second side plate.

8. The method of claim 7, further comprising inserting a fastener through aligned apertures in at least one of the second side plate and the cover and the captive member to pivotally connect the captive member to the frame.

9. The method of claim 7, further comprising positioning a biasing member between the captive member and a spacer positioned between the second side plate and the cover to bias the captive member into the engaging position.

10. A method of assembling a ratcheting strap adjuster, the method comprising:
obtaining a frame including a first side plate operatively connected to a second side plate, the first side plate having a first aperture and the second side plate having a second aperture aligned with the first aperture;
obtaining a rotation assembly including an intermediate portion interconnecting a proximal end and a distal end, the intermediate portion including a shaft, the proximal end including a knob, and the distal end including a ratchet portion, the ratchet portion including gear teeth;
obtaining a captive member having an engaging portion and a lever portion;
inserting the distal end including the ratchet portion of the rotation assembly through the first and second apertures and positioning the proximal end including the knob proximate the first side plate and the distal end including the ratchet portion proximate the second side plate;
movably connecting the captive member relative to the frame proximate the ratchet portion, wherein the captive member is movable between an engaging position and a releasing position, wherein the engaging portion is configured and arranged to selectively engage the ratchet portion of the rotation assembly in the engaging position.

11. The method of claim 10, further comprising operatively connecting the ratcheting strap adjuster to a safety harness, wherein the intermediate portion of the rotation assembly includes a slot, wherein at least one strap of the safety harness is routed through the slot.

12. The method of claim 10, wherein the knob, the shaft portion, and the ratchet portion are integral.

13. The method of claim 10, wherein the captive member is movably connected relative to the frame by pivoting about a fastener operatively connected to the frame.

14. The method of claim 10, wherein the captive member includes a biasing member receiver configured and arranged to receive a portion of a biasing member, further comprising positioning the portion of the biasing member in the biasing member receiver to place a biasing force on the captive member toward the engaging position, wherein placing a force on the lever portion overcomes the biasing force of the biasing member and moves the captive member toward the release position.

15. The method of claim 10, further comprising operatively connecting a cover to the second side plate after the distal end of the rotation assembly is inserted through the first and second apertures, the cover being part of the frame, wherein the ratchet portion and the captive member are positioned in a cavity between the cover and the second side plate.

16. The method of claim 15, further comprising inserting a fastener through aligned apertures in at least one of the second side plate and the cover and the captive member to pivotally connect the captive member to the frame.

17. The method of claim 15, further comprising positioning a biasing member between the captive member and a spacer positioned between the second side plate and the cover to bias the captive member into the engaging position.

18. A method of assembling a ratcheting strap adjuster, the method comprising:
obtaining a frame including a first side plate operatively connected to a second side plate and a cover configured and arranged to be operatively connected to the second side plate, the first side plate having a first aperture and the second side plate having a second aperture aligned with the first aperture;
obtaining a rotation assembly including an intermediate portion interconnecting a proximal end and a distal end, a ratchet portion being operatively connected to the distal end and including gear teeth;
obtaining a captive member having an engaging portion and a lever portion;
inserting the distal end including the ratchet portion of the rotation assembly through the first and second apertures and positioning the proximal end proximate the first side plate and the distal end proximate the second side plate; and
movably connecting the captive member relative to the frame proximate the ratchet portion, wherein the captive member is movable between an engaging position and a releasing position, wherein the engaging portion is configured and arranged to selectively engage the ratchet portion of the rotation assembly in the engaging position; and
operatively connecting the cover to the second side plat, wherein the ratchet portion and the captive member are positioned in a cavity between the cover and the second side plate.

19. The method of claim 18, further comprising operatively connecting the ratcheting strap adjuster to a safety harness, wherein the intermediate portion of the rotation assembly includes a slot, wherein at least one strap of the safety harness is routed through the slot.

20. The method of claim 18, wherein the proximal end includes a knob and the intermediate portion includes a shaft portion.

21. The method of claim 20, wherein the knob, the shaft portion, and the ratchet portion are integral.

22. The method of claim 18, wherein the captive member is movably connected relative to the frame by pivoting about a fastener operatively connected to the frame.

23. The method of claim 18, wherein the captive member includes a biasing member receiver configured and arranged to receive a portion of a biasing member, further comprising positioning the portion of the biasing member in the biasing member receiver to place a biasing force on the captive member toward the engaging position, wherein placing a force on the lever portion overcomes the biasing force of the biasing member and moves the captive member toward the release position.

* * * * *